United States Patent
Boe et al.

[11] Patent Number: 6,122,276
[45] Date of Patent: Sep. 19, 2000

[54] COMMUNICATIONS GATEWAY MAPPING INTERNET ADDRESS TO LOGICAL-UNIT NAME

[75] Inventors: Michael Boe, San Francisco, Calif.; Derek W. Bolton, Balmain, Australia

[73] Assignee: Cisco Technology, Inc., San Jose, Calif.

[21] Appl. No.: 08/890,610

[22] Filed: Jul. 9, 1997

Related U.S. Application Data

[60] Provisional application No. 60/053,005, Jun. 30, 1997.

[51] Int. Cl.[7] .................................. H04J 3/26; H04B 7/26
[52] U.S. Cl. ........................ 370/389; 370/331; 370/389; 709/229
[58] Field of Search .................................. 370/389, 466, 370/331; 364/228.2, 228.4, 228.5, 242.93; 709/229, 231, 236

[56] References Cited

U.S. PATENT DOCUMENTS

| | | | |
|---|---|---|---|
| 4,545,013 | 10/1985 | Lyon et al. | 714/712 |
| 4,644,532 | 2/1987 | George et al. | 370/255 |
| 4,750,109 | 6/1988 | Kita | 395/200.57 |
| 4,827,411 | 5/1989 | Arrowood et al. | 707/206 |
| 4,893,307 | 1/1990 | McKay | 370/389 |
| 4,922,486 | 5/1990 | Lidinsky et al. | 370/427 |
| 4,965,772 | 10/1990 | Daniel et al. | 709/224 |
| 5,021,949 | 6/1991 | Morten et al. | 709/231 |
| 5,046,066 | 9/1991 | Messenger | 370/349 |
| 5,050,165 | 9/1991 | Yoshioka et al. | 370/401 |
| 5,142,622 | 8/1992 | Owens | 709/227 |
| 5,226,120 | 7/1993 | Brown et al. | 709/224 |
| 5,287,103 | 2/1994 | Kasprzyk et al. | 340/825.52 |
| 5,371,852 | 12/1994 | Attanasio et al. | 709/245 |
| 5,442,633 | 8/1995 | Perkins | 370/331 |
| 5,473,608 | 12/1995 | Gagne et al. | 370/401 |
| 5,491,796 | 2/1996 | Wanderer et al. | 709/224 |
| 5,517,622 | 5/1996 | Ivanoff et al. | 709/232 |
| 5,526,358 | 6/1996 | Gregerson et al. | 709/221 |
| 5,544,162 | 8/1996 | Mraz et al. | 370/397 |
| 5,557,798 | 9/1996 | Skeen et al. | 705/35 |
| 5,559,955 | 9/1996 | Dev et al. | 714/4 |
| 5,583,862 | 12/1996 | Callon | 370/397 |
| 5,586,254 | 12/1996 | Kondo et al. | 714/25 |
| 5,588,119 | 12/1996 | Vincent et al. | 709/223 |
| 5,684,967 | 11/1997 | McKenna et al. | 345/329 |
| 5,684,988 | 11/1997 | Pitchaikani et al. | 395/615 |
| 5,737,525 | 4/1998 | Picazo, Jr. et al. | 709/249 |
| 5,754,830 | 5/1998 | Butts et al. | 395/500.44 |
| 5,764,625 | 6/1998 | Bournass | 370/231 |
| 5,796,728 | 8/1998 | Rondeau | 370/338 |
| 5,802,313 | 9/1998 | Mitchell | 709/238 |
| 5,805,822 | 9/1998 | Long et al. | 709/232 |
| 5,809,235 | 9/1998 | Sharma et al. | 709/230 |
| 5,845,081 | 12/1998 | Rangarajan et al. | 709/224 |
| 5,867,648 | 2/1999 | Foth et al. | 709/230 |
| 5,867,653 | 2/1999 | Aras et al. | 709/204 |

OTHER PUBLICATIONS

Printout of World Wide Web page http://www.ctron.com/products/items/Spectrum–Bluevision entitled "Spectrum/Blue Vision–for integrated SNA/LAN management", copyright 1995, 1996.

*Primary Examiner*—Ahmad F. Matar
*Assistant Examiner*—Khanh Quang Dinh
*Attorney, Agent, or Firm*—Cesari & McKenna, LLP

[57] ABSTRACT

When a TN3270 client (14) uses the Transmission Control Protocol/Internet Protocol ("TCP/IP")to initiate contact with a TN3270 server (18) to obtain access to an applications program running on a host (12) with which the server (18) employs the Systems Network Architecture ("SNA") protocol to communicate, the server's SNA physical-unit process sends the host's systems service control point an SNA NMVT message that includes a physical-location subfield in a product-set-attributes subvector of a product-set-ID vector. The physical-location subfield includes the client's IP address and TCP port number so that host management applications can determine individual clients' usages without interrupting communications with the server.

12 Claims, 7 Drawing Sheets

COMMUNICATIONS GATEWAY MAPPING INTERNET ADDRESS TO LOGICAL-UNIT NAME

CROSS-REFERENCE TO RELATED APPLICATION

This patent application claims the benefit under 35 U.S.C. §119(e) of U.S. Provisional Patent Application No. 60/053,005, filed on Jun. 30, 1997, by Michael Boe and Derek Bolton for a Communications Gateway Mapping Internet Address to Logical-Unit Name.

BACKGROUND OF THE INVENTION

The present invention is directed to computer communications and in particular to gateways that mediate communications between processes that communicate in different network protocols.

A large installed base of computer equipment employs a communications protocol known as Systems Network Architecture ("SNA"), which specifies the manner in which a host computer, for example, will communicate over a network with a device such as a terminal. At the same time, the Transmission Control Protocol/Internet Protocol ("TCP/IP")has enabled many disparate systems to communicate with each other over a wide variety of physical communications media.

To enable customers to communicate with SNA-compliant systems but take advantage of the large number of TCP/IP links, communications-equipment manufacturers have built communications gateways that translate between the two protocols. FIG. 1 depicts a typical gateway environment.

A user located in a city remote from a host mainframe computer 12 employs his terminal equipment 14, possibly in the form of a personal computer and modem, to gain access to an applications program that runs on the host 12. For this purpose, the user employs an Internet path 16; i.e., it employs the TCP/IP communications protocol to establish a Telnet connection. The Telnet connection is well known to the Internet community and described in its Requests for Comments ("RFCs") 854, 860 and 862.

The client terminal 14 is of a type sometimes referred to as a TN3270 emulator. The "TN" refers to the Telnet connection, and the "3270" signifies that the connection's data payload, namely, lines of EBCDIC characters and display parameters, takes the form of a "3270 data stream," so called because its form is that employed by IBM terminals and devices referred to as "3270s." (Actually, not all "3270"-device names take the form 327x, but all such devices do use the 3270 data stream.)

Such communication requires a TN3270 server such as server 18. Although the host in which the target application is running sometimes performs the TN3270-server process, having it do so is usually considered too prodigal a use of mainframe cycles. So FIG. 1 includes a communications channel 20 between the host 12 and the TN3270 server 18 to indicate that the TN3270 server is embodied in separate hardware.

TCP/IP transmissions occur in IP datagrams that include the transmitting node's IP address and encapsulate TCP segments that include the transmitting process's port number. The client-terminal process's TCP port number is usually arbitrary, but a TN3270 emulator connects to a server at a specific combination of IP address and TCP port number from which the server infers that the client thereby connected wishes to use the Telnet protocol.

To forward the terminal's information to the host, the TN3270 server will have to engage in an SNA communications session with the host 12. A brief digression follows to review a few well-known SNA features of particular relevance to the present discussion.

Communications software in an SNA node performs for each of that node's end users, such as a remote user terminal and the host applications program with which the user terminal is to communicate, a respective process called a logical unit ("LU"). The LU manages the data flow between the associated user and an LU being performed for some other end user. Additionally, each node performs a further process, called a physical unit ("PU"), that manages that node equipment's LUs and presents their data to the channel 20. (For reasons not relevant to the present discussion, a given hardware node may actually have more than one PU, but little is lost by considering the special case in which each hardware node runs only a single PU process.) Finally, one of the network nodes performs a further process called a systems services control point ("SSCP"), whose responsibility is the SNA network's overall organization. (Actually, different parts of the network can be organized by SSCPs operating in different nodes, but it simplifies the discussion to consider a single-SSCP network.) The host's Virtual Telecommunication Access Method (VTAM) software customarily provides this capability.

Now, let us assume that the host's SSCP process has already performed various initial network-organization tasks, such as activating PU processes in each SNA node. For instance, we assume that the SSCP has already activated PUs in the TN3270 server 18 as well as in an SNA communications controller 22 and a cluster controller 24 with which it communicates by way of a communications link 26 dedicated to communications between SNA devices. The cluster controller 24's purpose is to encapsulate data streams from non-SNA equipment such as a terminal 26 or workstation 28 in SNA messages for communication over the SNA network and to extract data streams from SNA messages for forwarding to that equipment.

After the network has been initialized, link-level transmissions that support communication among SNA network-addressable units, i.e., among units such as the PUs, the LUs, and the SSCP, occurs in basic link units whose format FIG. 2's first row depicts. At the first row's level of detail, the illustrated link unit's RU field can be thought of as the payload of lower-level processes that use the outer fields for bit transmission through individual links, for data transmission and routing through paths consisting of those links, and for management of communications sessions between network-addressable units. In addition, certain bits of the RH field affect the RU field's interpretation.

Now, the manner in which a given network node's LU process can be initiated depends on the particular SNA network and its node's capabilities. But in many cases the peripheral-node LU cannot be activated unless that node's PU receives a request to do so from the SSCP by way of such a link unit. We assume that terminal 26 and workstation 28 were already attached when the SSCP did the initialization, so the SSCP immediately orders that respective LU processes be activated for those devices. In a scenario that we now discuss by reference to FIG. 3, we assume that the TN3270 client 14 is not initially attached to the server 18 but that the host 12 nonetheless begins operation by activating in the server an LU process that can represent a client when one does become attached.

To this end the host sends a link unit whose transmission FIG. 3's line A represents. In that link unit the RH field's contents indicate that the RU contains not end-user data but rather an SNA request of an unspecified type within a specified category of requests and responses, and a request-code-indicating part of the RU indicates that the resquest is of the type whose mnemonic in SNA literature is ACTLU. This type of request directs a PU to activate an LU, and its RU field further specifies a local address, which the SSCP thereby assigns to the LU being activated.

As is well known to those skilled in the art, there are many request messages that the SNA protocol requires the receiving network-addressable unit to acknowledge. According to the protocol, the acknowledging unit fulfills this requirement by sending back a message whose "request" code is the same as that of the request message to which it is responding but whose RH field identifies it as a response rather than a request. For that reason, the message-type-identifying part of the RU field is often called a request/response code instead of a request code. In FIG. 3's line B, the notation "+Rsp" represents the acknowledgment of the preceding message, the plus sign indicating that the request was processed in the normal manner. The ACTLU response includes a field that indicates whether the LU is enabled, and in this case that field states that the LU is disabled.

FIG. 3's line C represents the client 14's thereafter establishing a TCP/IP connection, and line D represents a "TN3270 negotiation," the conventional Telnet colloquy by which a TN3270 emulator and a TN3270 server arrive at ground rules for subsequent communication. Having established those ground rules, the TN3270 server must conduct a corresponding session with the host, so its PU sends the SSCP a "request" of the type known as "Notify" in SNA literature, and the SSCP acknowledges the request, as FIG. 3's lines G and H indicate. The Notify request's contents indicate that the LU is now available for a communications session, so the SSCP now considers it enabled and upon its request establishes a communications session between that LU and a host LU that supports communications with a host-resident application to which the client's user desires access. Line I represents the resultant LU—LU session, which contains a TN3270 data stream.

The client eventually finishes the session and disconnects, as line J indicates, and lines K and L represent a Notify request and resultant response by which the host is advised and acknowledges that the LU is disabled.

At some point a new user may want to use a new client 30 (FIG. 1) to obtain access to the host application. For that purpose, client 30 establishes a TCP/IP link and performs a TN3270 negotiation with the server 18, as lines O and P indicate. For communication with the applications-process LU, and the server may choose to use the same LU process and therefore employ a Notify request (line S) to advise the host that the LU is now available for a session, and the host issues a resultant response in acknowledgment, as line T indicates. As lines U–X indicate, the LU—LU session and subsequent disconnect and disablement proceed as before.

In many installations, it is important for billing or other management purposes to keep track of different clients' use of various applications. For this purpose, a host-computer management application may monitor the SSCP's operations and thereby assemble statistics of various clients' usage. In traditional, all-SNA systems, this does not require any interference with communications; the messages that the LUs send to initiate sessions with others identify the logical units involved. For instance, the cluster controller 24 performs an LU process for each of its attached peripherals, and a given LU's local address therefore identifies the terminal 24, workstation 26, or other device by which a user obtains access to the target application.

In the TN3270 context, though, identifying the LU is not enough. As was explained above, different clients can employ the same logical unit. So the management application would itself have to include a process for real-time detection of session termination and for thereupon initiating a session with the TN3270 server to ask it the identity of the client whose session had just been completed. Time-sharing operations that employ SNA networks have therefore tended to forgo the convenience of Internet-link usage when billing or other user-based accounting has been important.

SUMMARY OF THE INVENTION

We have recognized that the need for such a management application to interrupt the communications operations can be eliminated by having the TN3270 server send the SSCP, for each new LU activation and/or deactivation, an SNA message similar to a type that might be sent in adapting dynamic logical-unit definition to TN3270 use.

As was explained above, the host traditionally predefines and preactivates all dependent LUs, but more-recent protocol developments have provided for defining LUs dynamically during operation. This feature lends itself particularly to TN3270 use, and FIG. 4 depicts a scenario that illustrates how TN3270 operation could take advantage of it.

In the FIG. 4 sequence, the SSCP does not initially activate an LU process in the server 18 in anticipation of its use for a not-yet-connected client. Lines A and B depict the client and server's initial communications as taking place without a server LU's having been activated. As was stated above, the peripheral-node LU cannot be activated unless the SSCP sends the server's PU a request to do so. So the SSCP must in some way be prompted to do this, and FIG. 3's line C represents a way in which this can be done. Specifically, the server's PU sends the SSCP a type of SNA request called an NMVT (for "Network Management Vector Transport'). This is a variable-length SNA request/response unit that carries data concerning the management of the network.

We return to FIG. 2 to illustrate the NMVT's structure. When such a message is to be sent, the RH contents specify the "Network Services" category of request messages, and the RU field's first, RC field identifies the request as being of the NMVT type if its (three-byte) value is $41038D_H$. An NMVT has the format that FIG. 2's second row sets forth. The second, "Required Info" field of such a request is known to be five bytes long, and it contains certain information necessary to this type of request but not of particular interest to the present discussion.

The remainder of the NMVT consists of "vectors," whose formats and meanings are specified by their own internal headers. In general, an NMVT "request" is best thought of not as a request but simply as a container for vectors that deal with network management. In the present scenario, that field contains a single vector, whose format FIG. 2's third line depicts. The vector's first, two-byte field gives its length in bytes ($0054_H$ in this example), and the next, two-byte field specifies the vector's type. In this case the type code is $0090_H$, which is the code for a Reply PSID ("Product Set ID")vector. (The "reply" designation is merely historical; in fact, this vector can be sent unsolicited, as it is here.) A Reply PSID's remaining fields are subvectors, each of which has its own internal header fields that specify its respective length and type. The subvector codes set forth in FIG. 2's third line are the SNA codes for those subvectors' types.

Recall that the purpose of line C's PSID-containing NMVT is to prompt the SSCP to activate an LU in the TN3270 server. Of particular interest in this context are its first two subvectors (codes $04_H$ and $82_H$), of which FIG. 2's fourth row depicts the latter. That subvector's first byte gives the subvector's length, and its second byte is the subvector's type code $82_H$. Code $82_H$ indicates that its contents are subfields that represent various information concerning a port-attached device and that have length/type headers just as subvectors do. In this scenario, the second subfield's type code is $20_H$, which indicates that the subfield represents the device's power-on status, and the remaining byte has a value of $01_H$, indicating that the device is in the connected state.

The drawings do not similarly show the internal format of the PSID's first subvector, but its code, $04_H$, indicates that its contents are addresses of various types, and one of the addresses that it contains is the local address, designated "x" in FIG. 4, to be assigned to the logical unit whose activation it is the NMVT's purpose to prompt. Subvector $11_H$, whose internal format the drawings also omit, contains information concerning the terminal's physical attributes (its "model").

Since the local address that the TN3270 server's PU thereby submits is not in the SSCP's list of activated LUs associated with that PU, the SSCP can interpret the vector as prompting it to order activation of a new LU and to give the new LU that address. So it sends an ACTLU request to the PU, placing the local address specified by line C's NMVT into the ACTLU field that contains the local address to be assigned to the LU. A field in the TN3270 server's resultant (positive) response (line F) indicates that the activated LU is in its enabled state.

The LU can thereupon ask the SSCP to place it into a session with one of the LUs associated with an applications program to which the user wants access. With that LU—LU session thereby established the end users can exchange a 3270 data stream through that session in the normal manner. Communications can thereafter progress in a manner the same as that in which they proceed in the scenario of FIG. 3, although FIG. 4 depicts the exchange as including another NMVT and response, represented by lines O and P, that could be used in accordance with the protocol to transmit a model-number change for dynamically defined LUs.

We have developed a way of using an NMVT to enable host management applications to keep track of different clients' usages in most cases by merely monitoring the normal message traffic. We include in the NMVT PSID a Product Set Attributes subvector having a physical-location subfield. The physical-location subfield is rarely if ever used in conventional TN3270 applications, and it was originally intended to indicate something like the cable bay in which associated equipment is located. But we use it to set forth the client's IP address and/or TCP port number. In most cases this uniquely identifies the client that starts a new session, so even when different users employ the same TN3270-server LU, a host management application can distinguish between the different users, without interfering with the communications operation, simply by referring to data normally collected by the host's VTAM software in the normal course of its operations.

All this requires in the case of a conventional, "static-LU" TN3270 server is adding such an NMVT to its message flow. For a server that adopts dynamic LU activation, all that is necessary is to add a single subvector to the PSID that would be sent anyway.

BRIEF DESCRIPTION OF THE DRAWINGS

The invention description below refers to the accompanying drawings, of which.

DETAILED DESCRIPTION OF AN ILLUSTRATIVE EMBODIMENT

Figure 3:
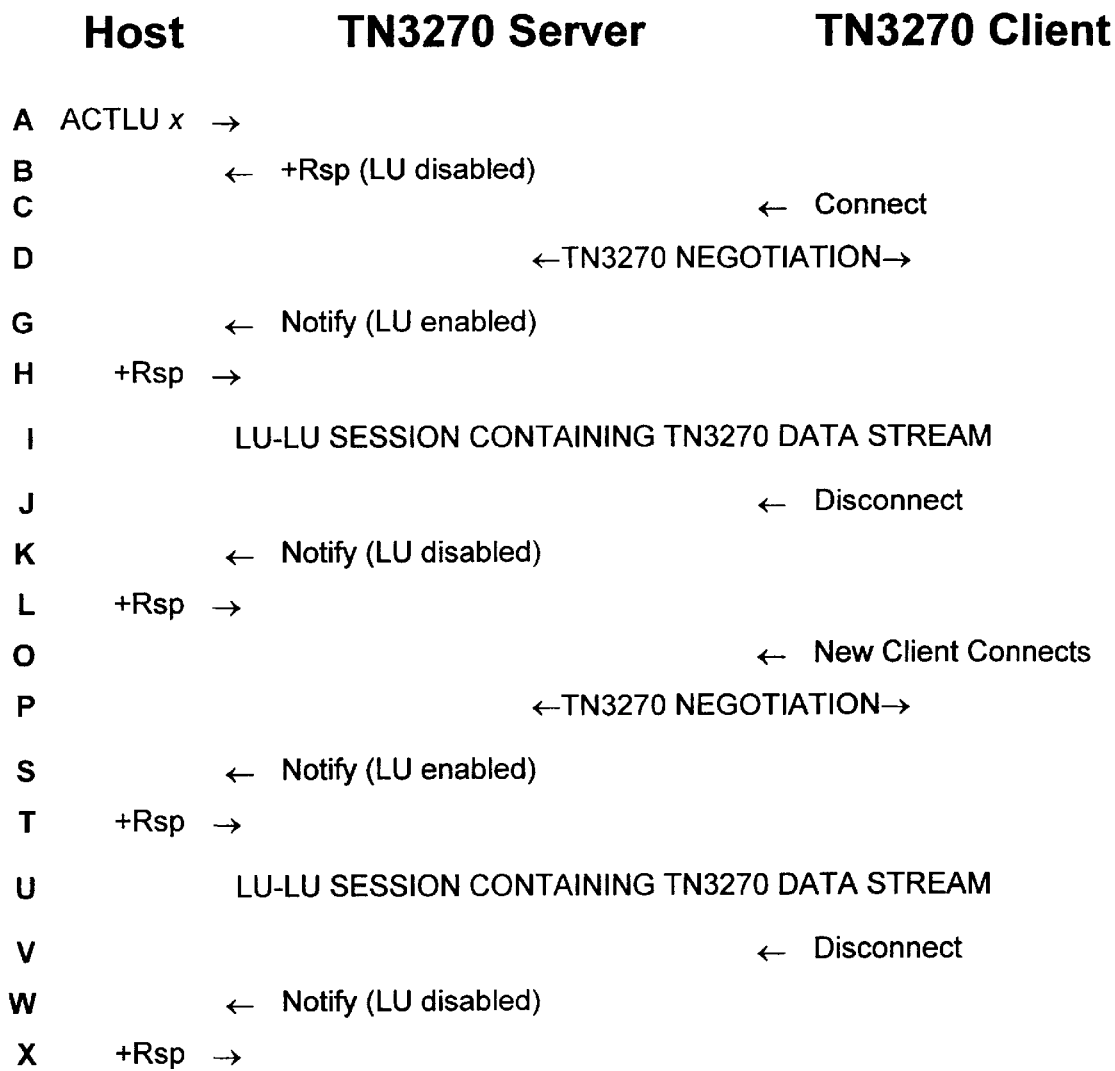
FIG. 3, described above, is a diagram of a conventional TN3270 transaction sequence.
Figure 5:
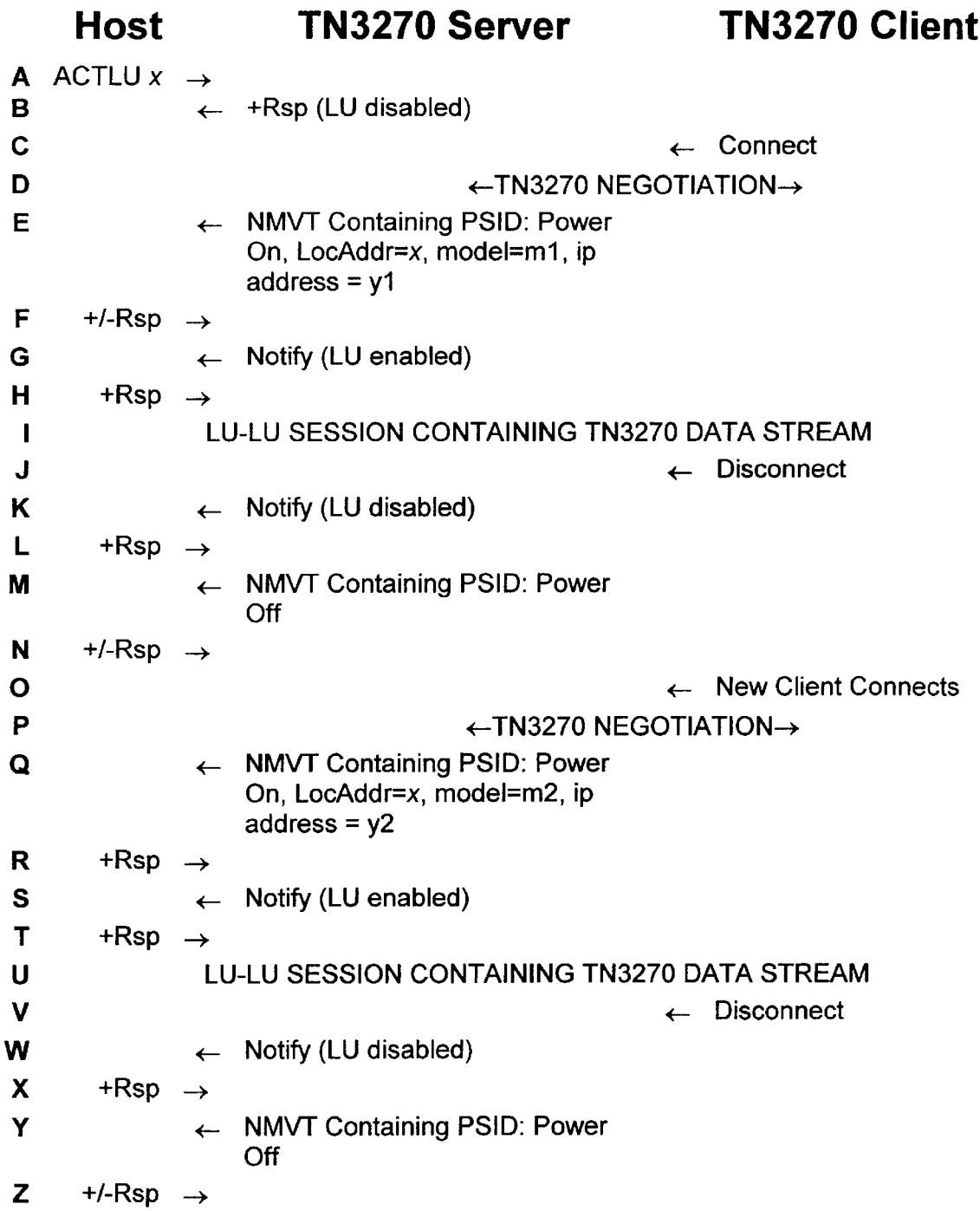
FIG. 5 is a diagram similar to FIG. 3 but illustrating transactions in a computer system that employs the present invention's teachings.
Figure 6:
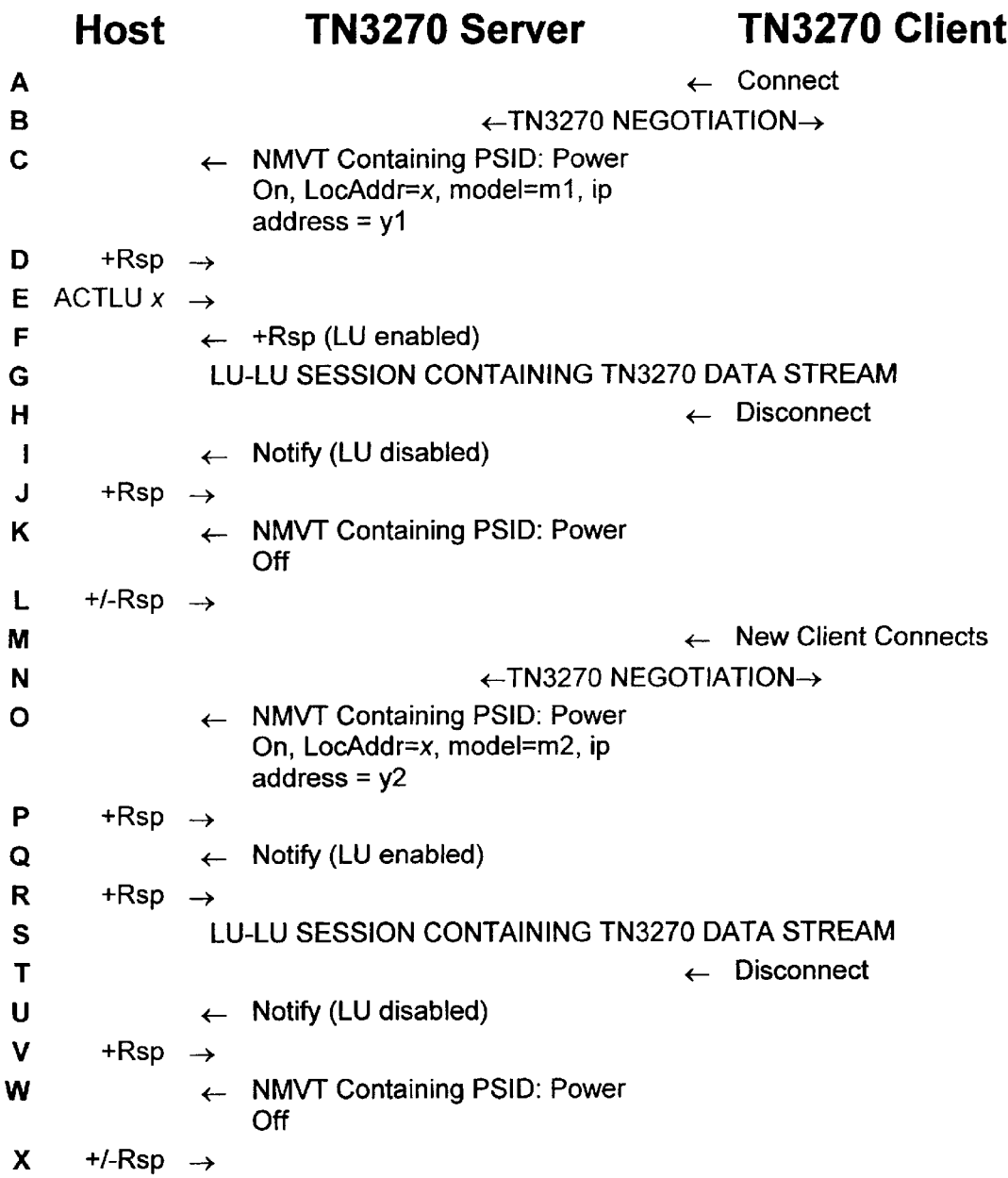
FIG. 6 is a diagram similar to FIG. 4 but illustrating transactions in a computer system that employs the present invention's teachings.

The present inventions can be practiced in a computer system in which the TN3270 server's operation differs only slightly from that of a conventional server. FIGS. 5 and 6 depict operating sequences for systems that implement the present invention's teachings. They correspond to FIGS. 3 and 4 in that they respectively employ static and dynamic LUs.

Figure 1:
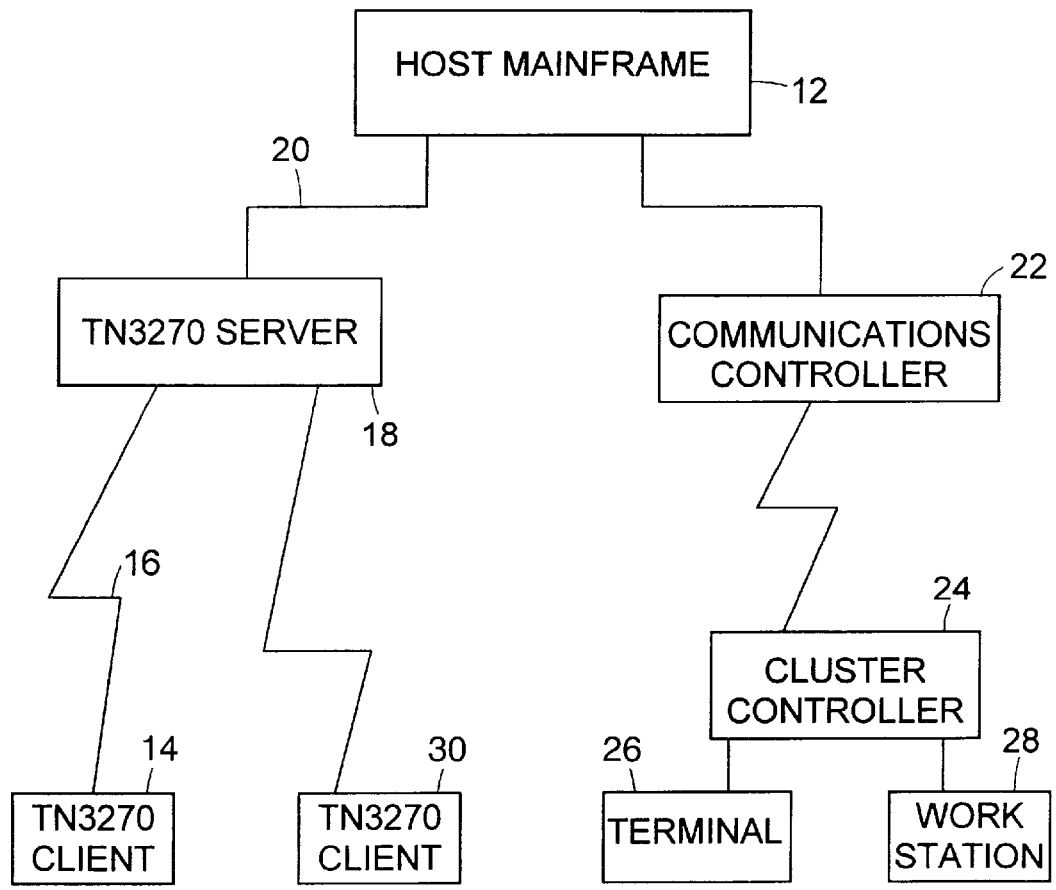
FIG. 1, described above, is a block diagram of a computer system of the type in which the present invention's teachings may be practiced.
Figure 2:
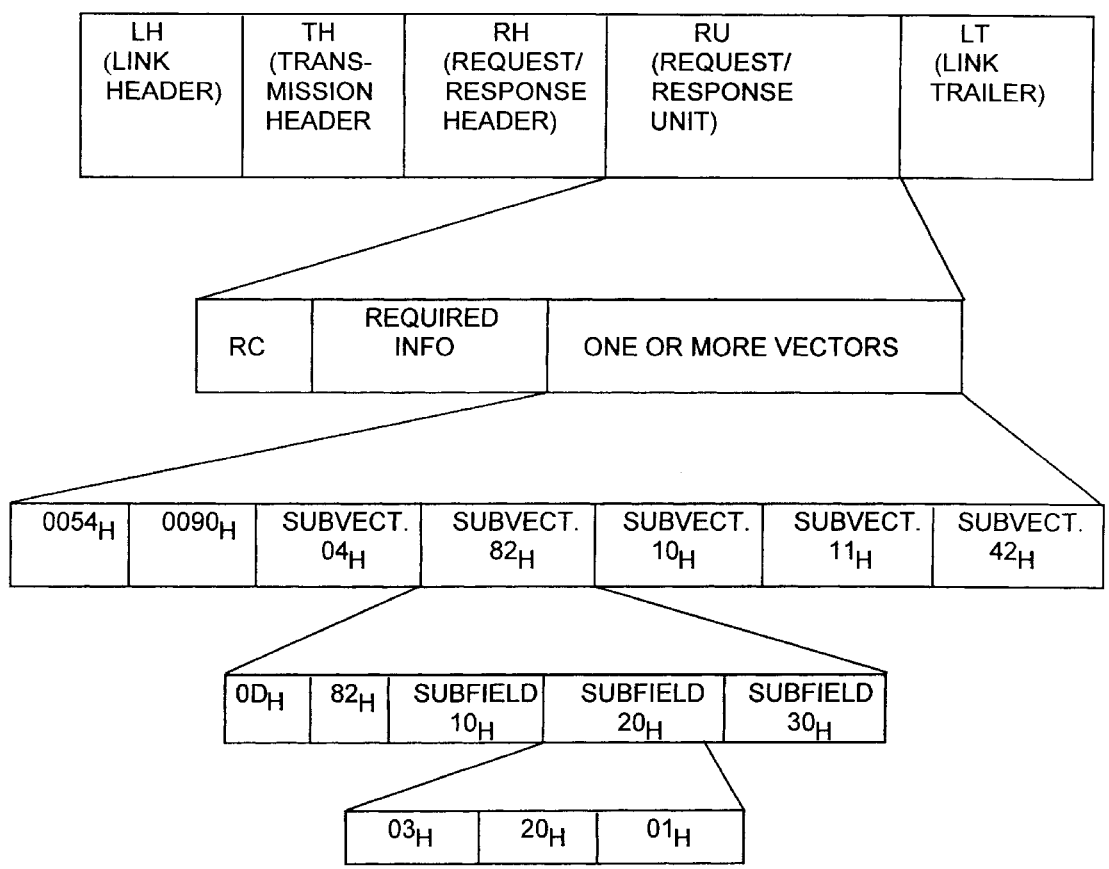
FIG. 2, described above, is a diagram of various SNA basic-link-unit fields.
Figure 4:
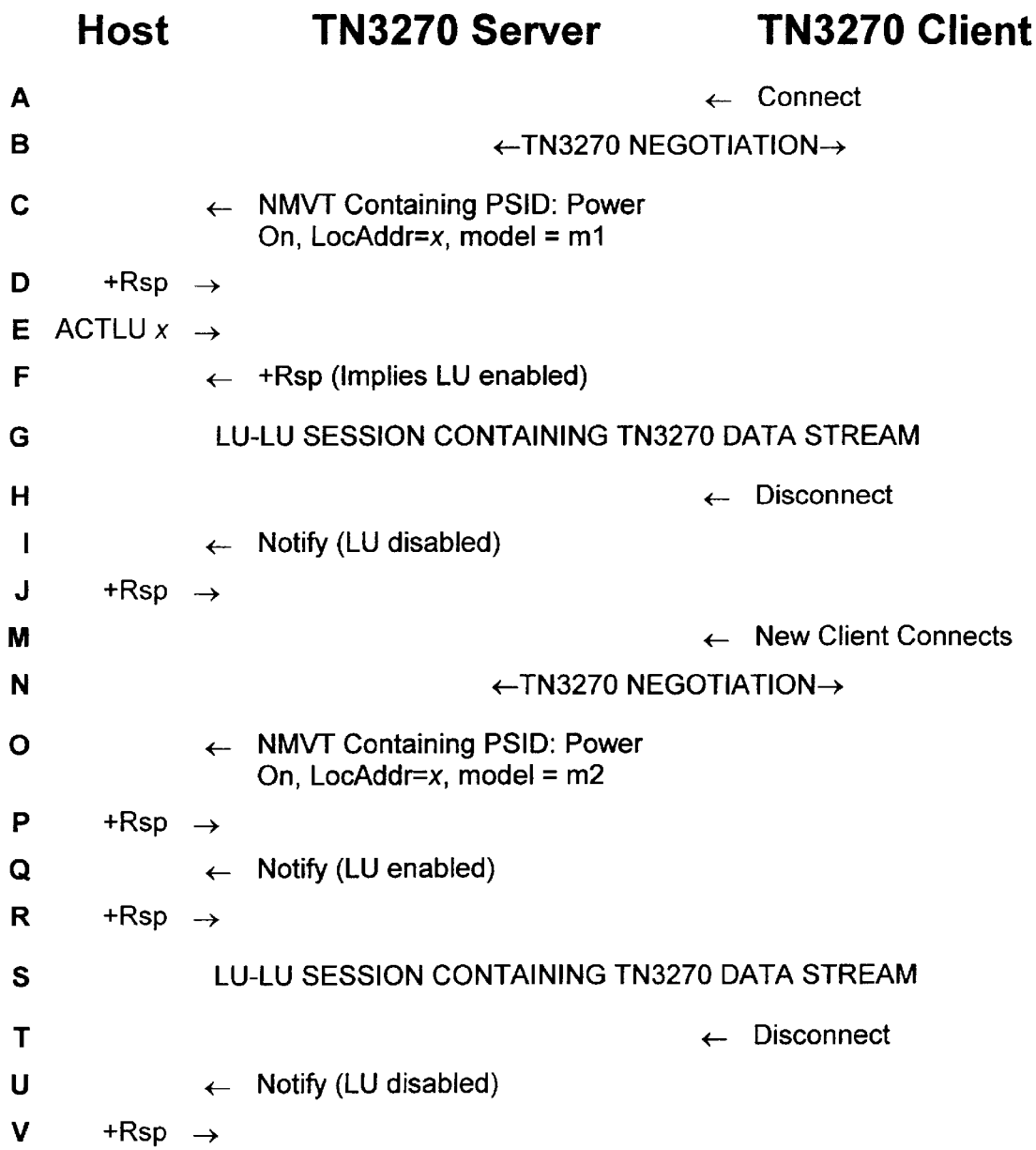
FIG. 4, described above, is a diagram of another TN3270 transaction sequence.
Figure 7:
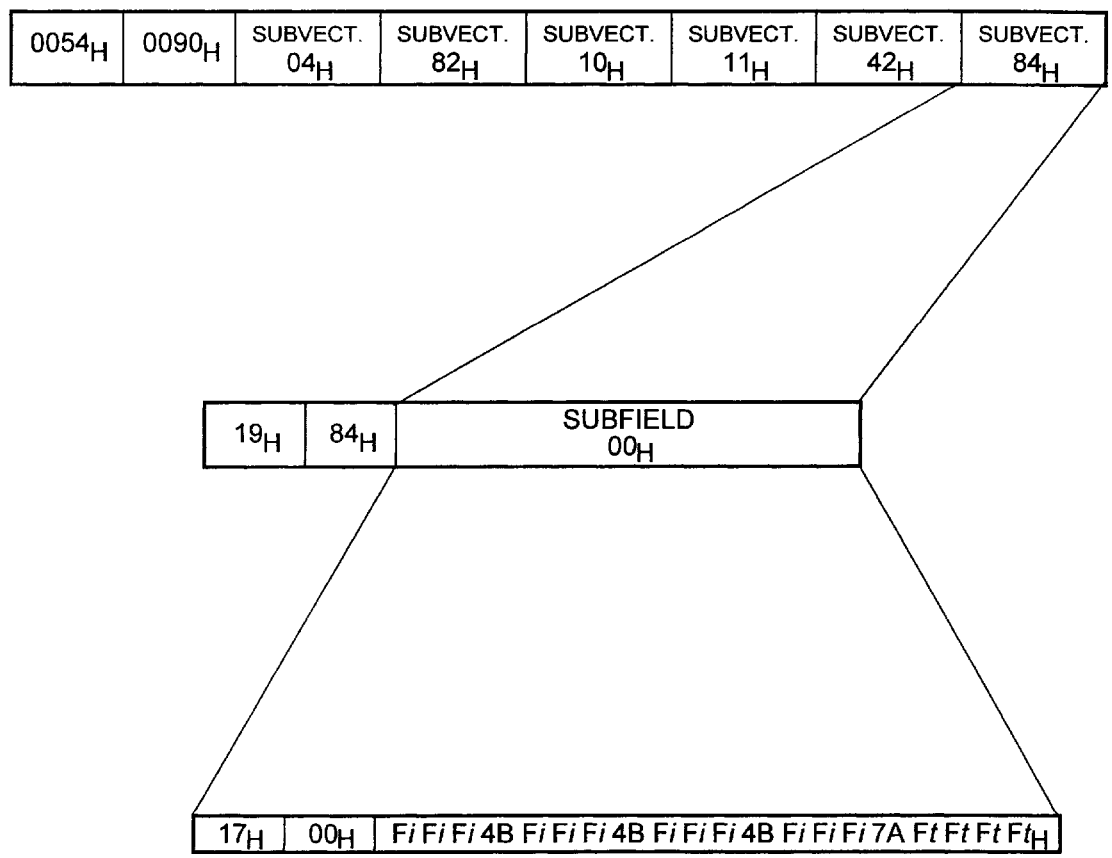
FIG. 7 is a diagram of Product Set Attributes subvector sent by a TN3270 server that employs the present invention's teachings.

The NMVTs of FIG. 6's lines C, K, O, and W differ from the corresponding messages in FIG. 4 only in that the PSID of FIG. 2's third row additionally includes a subvector of type $84_H$, as FIG. 7 illustrates. Subvectors of that type have the format exemplified by FIG. 7's middle row. The contents of that subvector's first field indicate that its length in bytes is $19^H$, and its second-field contents, whose value is $84_H$, indicate that its third-field contents represent a physical location. Historically, such a subvector was intended to indicate a hardware device's equipment bay or other designation of the equipment's physical location. However, such information—and, consequently, this subvector—are not conventionally included for TN3270 use. We use it, but its contents in our approach are the TN3270 client's IP address and TCP port number, which the TN3270 server must ordinarily know, of course, in order to use the Internet for communication with the client.

Actually, there are some environments in which the client IP address as seen by the server is one that a node interposed between the client and the server has dynamically invented. (This is known as Dynamic Host Configuration Protocol, or "DHCP," and defined in RFC 1541.) In such an environment, the TCP/IP address may not uniquely identify the client. Even in such an environment, though, the server may be able to identify the client to the host by maintaining a table of DHCP nodes and, when the address is that of such a node, interrogating it about the actual client's identity. In that case, the server would identify the client to the host by domain name (from the Domain Name System, or "DNS," defined in RFC 1035) instead of TCP/IP address.

To specify the IP address and TCP port number, we employ EDCDIC decimal digits for both the IP address and the TCP port number, with the address and port number separated by a colon and the IP-address octets separated by periods, although any other format could be used instead. This format is illustrated in FIG. 7's bottom row, where i and t represent the last four bits of the EBCDIC code for a decimal digit in an IP-address or TCP port number, respectively.

The power-on PSID of FIG. 6's line C identifies the client and indicates that it is connected, the power-off PSID of line K indicates that that it has disconnected, and the PSIDs of lines O and W identify a new client and similarly delimit is connection interval. FIG. 5's Lines E, M, Q, and Y represent corresponding messages by which the present invention's teachings can be implemented in a static-LU system.

Through this technique, data normally collected by the host's VTAM software uniquely identify each TN3270 client and enable that client's usage to be monitored. Our invention thereby removes a barrier to greater Internet use by a large installed base of mainframe users. It thus constitutes a significant advance in the art.

What is claimed is:

1. In a communications gateway for forwarding to a Systems Network Architecture channel in a session between logical units information received from a client by way of an Internet Protocol link in Internet Protocol datagrams that include a source Information Protocol address and a Transmission Control Protocol port number, the improvement comprising circuitry that for each such session transmits over the SNA channel a Reply Product Set Id (PSID) vector that includes a physical-location subvector whose contents represent at least one of the Internet Protocol address and the Transmission Control Protocol port number.

2. A communications gateway as defined in claim 1 wherein the contents of the PSID vector's physical-location subvector represent both the Internet Protocol address and the Transmission Control Protocol port number.

3. A communications gateway as defined in claim 1 wherein the gateway transmits the Reply PSID vector in response to connection with the client.

4. A communications gateway as defined in claim 3 wherein the Reply PSID vector includes a power-on-indicating subfield.

5. A communications gateway as defined in claim 3 wherein the gateway additionally responds to disconnection from the client by transmitting a Reply PSID vector that includes a physical-location subvector whose contents represent the Internet Protocol address and/or Transmission Control Protocol port number.

6. A communications gateway as defined in claim 5 wherein the Reply PSID vector transmitted in response to the client's disconnection includes a power-off-indicating subfield.

7. In the method of forwarding to a Systems Network Architecture channel in a session between logical units information received from a client by way of an Internet Protocol link in Internet Protocol datagrams that include a source Information Protocol address and a Transmission Control Protocol port number, the improvement comprising transmitting over the SNA channel for each such session a Reply Product Set ID (PSID) vector that includes a physical-location subvector whose contents represent at least one of the Internet Protocol address and the Transmission Control Protocol port number.

8. A method as defined in claim 7 wherein the contents of the PSID vector's physical-location subvector represent both the Internet Protocol address and the Transmission Control Protocol port number.

9. A method as defined in claim 7 wherein the step of transmitting the Reply PSID vector is performed in response to connection to the client.

10. A method as defined in claim 9 wherein the Reply PSID vector includes a power-on-indicating subfield.

11. A method as defined in claim 9 further including the step of responding to disconnection from the client by transmitting a Reply PSID vector that includes a physical-location subvector whose contents represent the Internet Protocol address and/or Transmission Control Protocol port number.

12. A method as defined in claim 11 wherein the Reply PSID vector transmitted in response to the client's disconnection includes a power-off-indicating subfield.

* * * * *